(12) United States Patent
Helmick et al.

(10) Patent No.: US 11,436,153 B2
(45) Date of Patent: Sep. 6, 2022

(54) MOVING CHANGE LOG TABLES TO ALIGN TO ZONES

(71) Applicant: Western Digital Technologies, Inc., San Jose, CA (US)

(72) Inventors: Daniel L. Helmick, Broomfield, CO (US); Mark Dancho, Chandler, AZ (US); Ryan R. Jones, Mesa, AZ (US)

(73) Assignee: Western Digital Technologies, Inc., San Jose, CA (US)

( * ) Notice: Subject to any disclaimer, the term of this patent is extended or adjusted under 35 U.S.C. 154(b) by 35 days.

(21) Appl. No.: 16/883,901

(22) Filed: May 26, 2020

(65) Prior Publication Data

US 2021/0374067 A1     Dec. 2, 2021

(51) Int. Cl.
*G06F 12/10* (2016.01)

(52) U.S. Cl.
CPC ...... *G06F 12/10* (2013.01); *G06F 2212/1032* (2013.01)

(58) Field of Classification Search
CPC ......... G06F 12/0246; G06F 2212/7201; G06F 3/064; G06F 3/0679; G06F 2212/1044; G06F 2212/7204; G06F 3/061; G06F 3/0619; G06F 3/0644; G06F 9/5077
USPC ......... 711/103, E12.061, 173, 206, E12.001, 711/E12.002, E12.008, 100
See application file for complete search history.

(56) References Cited

U.S. PATENT DOCUMENTS

| | | | |
|---|---|---|---|
| 10,621,049 B1* | 4/2020 | Certain | G06F 11/1471 |
| 2005/0141312 A1* | 6/2005 | Sinclair | G06F 11/141 |
| | | | 365/222 |
| 2009/0043984 A1* | 2/2009 | Chang | G06F 3/0679 |
| | | | 711/173 |
| 2010/0268864 A1* | 10/2010 | Ramiya Mothilal | ........................ |
| | | | G06F 12/1408 |
| | | | 711/103 |

(Continued)

FOREIGN PATENT DOCUMENTS

CN     101727400 A     6/2010

OTHER PUBLICATIONS

International Search Report and the Written Opinion for International Application No. PCT/US2020/065480 dated Apr. 19, 2021, 9 pages.

(Continued)

*Primary Examiner* — Sanjiv Shah
*Assistant Examiner* — Edward Waddy, Jr.
(74) *Attorney, Agent, or Firm* — Patterson + Sheridan, LLP; Steven H. VerSteeg (57) ABSTRACT

The present disclosure generally relates to methods of operating storage devices. The storage device is comprised of a controller, a random access memory (RAM) unit, and a NVM unit, wherein the NVM unit is comprised of a plurality of zones. The RAM unit comprises a first logical to physical address table and the NVM unit comprises a second logical to physical address table. The zones are partitioned into sections, and each partitioned section aligns with a change log table. Data is written to each zone sequentially, and only (Continued)

one partitioned section is updated at a time for each zone. Each time a zone is erased or written to in the NVM unit, the first logical to physical address table is updated and the second logical to physical address table is periodically updated to match the first logical to physical address table.

20 Claims, 6 Drawing Sheets

(56) References Cited

U.S. PATENT DOCUMENTS

| | | | |
|---|---|---|---|
| 2011/0082963 A1* | 4/2011 | Jeddeloh | G06F 12/0246 |
| | | | 711/103 |
| 2012/0203958 A1* | 8/2012 | Jones | G06F 12/0246 |
| | | | 711/103 |
| 2013/0080732 A1* | 3/2013 | Nellans | G06F 12/0246 |
| | | | 711/206 |
| 2017/0123679 A1* | 5/2017 | Yoshii | G06F 3/0661 |
| 2020/0104252 A1 | 4/2020 | Subbarao | |
| 2020/0167078 A1* | 5/2020 | Ke | G06F 3/0644 |

OTHER PUBLICATIONS

Mellor "Zoned SSDs live fast, die old, Western Digital claims," Mar. 27, 2019, 5 pages, retrieved from <https://blocksandfiles.com/2019/03/27/disk-shingling-scheme-driving-zoned-ssd-developments/>.

* cited by examiner

MOVING CHANGE LOG TABLES TO ALIGN TO ZONES

BACKGROUND OF THE DISCLOSURE

Field of the Disclosure

Embodiments of the present disclosure generally relate to storage devices, such as solid state drives (SSDs).

Description of the Related Art

Storage devices, such as SSDs, may be used in computers in applications where relatively low latency and high capacity storage are desired. For example, SSDs may exhibit lower latency, particularly for random reads and writes, than hard disk drives (HDDs). Typically, a controller of the SSD receives a command to read or write data from a host device to a memory device. The data is read and written to one or more erase blocks in the memory device. When a write command is received, the data associated with the write command has a logical block address (LBA). A logical to physical address (L2P) table stored in volatile memory of the SSD associates one or more LBAs of the data to a physical address of where the data is stored in the SSD when the data is written. The L2P table is updated whenever data is erased from the SSD to point to a sentinel value (e.g., "null"), such as during garbage collection operations.

However, data may be written to any physical location within the memory device, and the L2P table is updated sequentially as commands are received. Thus, when data is erased from the physical location in the memory device, several sentinel values may be included in the L2P table in an unaligned or non-sequential manner. Since volatile memory may be lost or erased when a power failure event occurs, a copy of the L2P table is also stored in the memory device, and the L2P table in the SSD must periodically be updated in change logs to match the L2P table stored in the volatile memory to protect against data loss. Since the size of the change logs of the L2P table are aligned to the size of the zone, the entire change log of the L2P table stored in the memory device may be updated, which is burdensome for the SSD. Additionally, upon experiencing a power failure event, portions of the L2P table in the volatile memory are programmed or copied to the L2P table stored in the memory device, which may result in a large amount of time being dedicated to writing the "nulls", rather than dedicating time to the more important information of the location of where current data is being stored.

Therefore, what is needed is a new method of improving change log power fail protection in a storage device.

SUMMARY OF THE DISCLOSURE

The present disclosure generally relates to methods of operating storage devices. The storage device is comprised of a controller, a random access memory (RAM) unit, and a NVM unit, wherein the NVM unit is comprised of a plurality of zones. The RAM unit comprises a first logical to physical address table and the NVM unit comprises a second logical to physical address table. The zones are partitioned into sections, and each partitioned section aligns with a change log table. Data is written to each zone sequentially, and only one partitioned section is updated at a time for each zone. Each time a zone is erased or written to in the NVM unit, the first logical to physical address table is updated and the second logical to physical address table is periodically updated to match the first logical to physical address table.

In one embodiment, a storage device comprises a non-volatile storage unit. The capacity of the non-volatile storage unit is divided into a plurality of zones. The non-volatile storage unit comprises a plurality of dies and each of the plurality of dies comprises a plurality of erase blocks. The storage device further comprises a volatile memory unit. The volatile memory unit stores a first logical to physical address table. The first logical to physical address table associates logical block addresses of data to a physical address of where the data is stored in the non-volatile storage unit. The storage also comprises a controller coupled to the non-volatile storage unit and the volatile memory unit. The controller is configured to write data to each zone of the plurality of zones sequentially, and partition the first logical to physical address table into sections. Each partitioned section size aligns with a change log table. The controller is further configured to update a second logical to physical address table stored in the non-volatile storage unit. The second logical to physical address table is updated in the partitioned section size.

In another embodiment, a storage device comprises a non-volatile storage unit. The capacity of the non-volatile storage unit is divided into a plurality of zones. The non-volatile storage unit comprises a plurality of dies and each of the plurality of dies comprises a plurality of erase blocks. The storage device also comprises a volatile memory unit. The storage device further comprises a controller coupled to the non-volatile storage unit and the volatile memory unit. The controller is configured to write data associated with one or more commands to a first zone of the plurality of zones sequentially, wherein each zone of the plurality of zones is partitioned into a plurality of sections, the partitioned section size aligning with a change log table. The controller is further configured to update a first logical to physical address table stored in the volatile memory unit. The controller is also configured to update the first logical to physical address table associating with the logical block addresses of the data associated with the one or more commands to a physical address of where the data associated with one or more commands is stored in the first zone. The controller is further configured to erase the data associated with one or more commands from the first zone and update the first logical to physical address table to show the first zone is empty. The controller is also configured to update a second logical to physical address table stored in the non-volatile storage unit to match the first logical to physical address table. The second logical physical address table is updated in the partitioned section size.

In another embodiment, a storage device comprises a non-volatile storage unit. The capacity of the non-volatile storage unit is divided into a plurality of zones. The non-volatile storage unit further comprises a plurality of dies and each of the plurality of dies comprises a plurality of erase blocks. The storage device also comprises a volatile memory unit. The volatile memory unit stores a first logical to physical address table. The first logical to physical address table associates logical block addresses of data to a physical address of where the data is stored in the non-volatile storage unit. Furthermore, the storage device comprises means for partitioning each zone of the plurality of zones into a plurality of sections, wherein each partitioned section of the plurality of sections aligns with a change log table, and means for updating a partitioned section of a zone each time a command to write data to the zone is received. The storage device further comprises means for updating the first logical to physical address table each time is erased from the non-volatile storage unit. The data erased from the non-volatile storage unit is in a zone capacity size. The storage device comprises means for updated a second logical to physical address table stored in the non-volatile storage unit to match the first logical to physical address table. The second logical to physical address table is updated in the partitioned section size.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to methods of operating storage devices. The storage device is comprised of a controller, a random access memory (RAM) unit, and a NVM unit, wherein the NVM unit is comprised of a plurality of zones. The RAM unit comprises a first logical to physical address table and the NVM unit comprises a second logical to physical address table. The zones are partitioned into sections, and each partitioned section aligns with a change log table. Data is written to each zone sequentially, and only one partitioned section is updated at a time for each zone. Each time a zone is erased or written to in the NVM unit, the first logical to physical address table is updated and the second logical to physical address table is periodically updated to match the first logical to physical address table.

Figure 1:
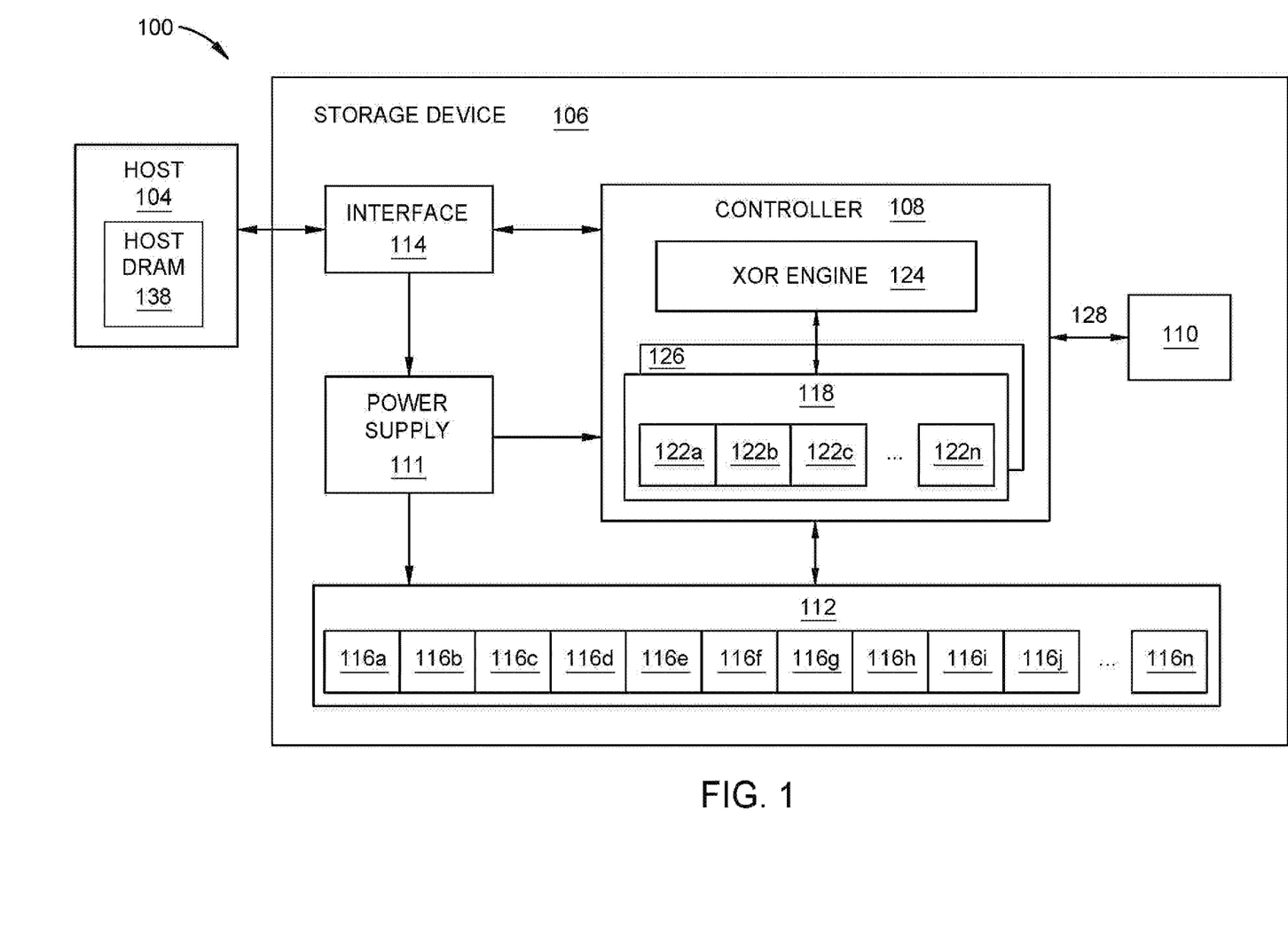
FIG. 1 is a schematic block diagram illustrating a storage system, according to one embodiment.

FIG. 1 is a schematic block diagram illustrating a storage system 100 in which storage device 106 may function as a storage device for a host device 104, in accordance with one or more techniques of this disclosure. For instance, the host device 104 may utilize a storage unit 110, such as non-volatile memory (NVM), included in storage device 106 to store and retrieve data. In the following descriptions, a non-volatile storage unit may be referenced as a non-volatile memory (NVM) for simplification. The host device 104 comprises a host DRAM 138. In some examples, the storage system 100 may include a plurality of storage devices, such as the storage device 106, which may operate as a storage array. For instance, the storage system 100 may include a plurality of storages devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the storage device 106. As illustrated in FIG. 1, the host device 104 may communicate with the storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The storage device 106 includes a controller 108, NVM 110, a power supply 111, a first random-access memory (RAM) or volatile memory 112, such as a dynamic random-access memory (DRAM), and an interface 114. The controller 108 may comprise a parity engine or a XOR engine 124 and a second RAM or volatile memory 118, such as a static random-access memory (SRAM). The XOR engine 124 is a type of parity engine and is called out as a XOR engine for exemplary purposes. However, the XOR engine 124 may include other embodiments that the parity engine comprises. In the following descriptions, a first RAM or volatile memory 112 may be referenced to as DRAM memory and a second RAM or volatile memory 118 may be referenced as SRAM memory for simplification and exemplary purposes.

In some examples, the storage device 106 may include additional components not shown in FIG. 1 for sake of clarity. For example, the storage device 106 may include a printed circuit board (PCB) to which components of the storage device 106 are mechanically attached and which includes electrically conductive traces that electrically interconnect components of the storage device 106, or the like. In some examples, the physical dimensions and connector configurations of the storage device 106 may conform to one or more standard form factors. Some example standard form factors include, but are not limited to, 2.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the storage device 106 may be directly coupled (e.g., directly soldered) to a motherboard of the host device 104.

The interface 114 of the storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, PCIe, non-volatile memory express (NVMe), OpenCAPI, GenZ, Cache Coherent Interface Accelerator (CCIX), Compute Express Link (CXL), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the storage device 106 to receive power from the host device 104. For example, as illustrated in FIG. 1, the power supply 111 may receive power from the host device 104 via the interface 114.

The storage device 106 includes NVM 110, which may include a plurality of memory devices. NVM 110 may be configured to store and/or retrieve data. For instance, a memory device of NVM 110 may receive data and a message from the controller 108 that instructs the memory device to store the data. Similarly, the memory device of NVM 110 may receive a message from the controller 108 that instructs the memory device to retrieve data. In some examples, each of the memory devices may be referred to as a die. In some examples, a single physical chip may include a plurality of dies (i.e., a plurality of memory devices). In some examples, each of the memory devices may be configured to store relatively large amounts of data (e.g., 128 MB, 256 MB, 412 MB, 1 GB, 2 GB, 3 GB, 8 GB, 16 GB, 22 GB, 54 GB, 128 GB, 256 GB, 412 GB, 1 TB, etc.).

In some examples, each memory device of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, hard disk drives (HDD), and any other type of non-volatile memory devices.

The NVM 110 may comprise a plurality of flash memory devices. Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a wordline to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), quad level cell (QLC), or other higher iterations of level cell. The controller 108 may write data to and read data from NAND flash memory devices at the page level and erase data from NAND flash memory devices at the block level.

A portion of the NVM 110 may be formatted into logical blocks such that a capacity of the NVM 110 is divided into a plurality of zones or a plurality of streams. Each of the zones or the streams comprise a plurality of physical or erase blocks of the NVM 110, and each of the erase blocks are associated a plurality of logical blocks. Each of the logical blocks is associated with a unique LBA or sector. Each of the zones or the streams may have a size aligned to the capacity of one or more erase blocks of the NVM 110. When the controller 108 receives a command, such as from a host device 104, the controller 108 can read data from and write data to the plurality of logical blocks associated with the plurality of erase blocks of the NVM 110.

The storage device 106 includes a power supply 111, which may provide power to one or more components of the storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The storage device 106 also includes volatile memory, which may be used by controller 108 to store information. Volatile memory may be comprised of one or more volatile memory devices. In some examples, the controller 108 may use volatile memory as a cache. For instance, the controller 108 may store cached information in volatile memory until cached information is written to the NVM 110. Examples of volatile memory 112 include, but are not limited to, RAM, DRAM 112, SRAM 118, and synchronous dynamic RAM (SDRAM (e.g., DDR1, DDR2, DDR3, DDR3L, LPDDR3, DDR4, LPDDR4, DDR5, LPDDR5, and the like)). As illustrated in FIG. 1, volatile memory may consume power received from the power supply 111.

The various types of volatile memories may be used with different access properties. For example, DRAM 112 may be arranged for longer burst accesses to allow for improved bandwidth (BW) of the same access bus. Alternatively, DRAM 112 may be used with smaller accesses such that random small accesses may have better latency. The controller 108 comprises additional optional SRAM and/or embedded MRAM 126. Embedded MRAM 126 is another alternative memory that may be used in another embodiment. Similarly, the access to the MRAM 126 can be optimized for different design purposes, but the quantity of embedded MRAM 126 in the SSD controller 108 may be cost sensitive. Therefore, the choice of how much data and which data goes into the premium non-volatile memory and premium volatile memory will subject to system tradeoffs.

The storage device 106 includes a controller 108, which may manage one or more operations of the storage device 106. For instance, the controller 108 may manage the reading of data from and/or the writing of data to the NVM 110 via a toggle mode (TM) bus 128. The controller 108 may comprise of an XOR engine 124. The data may be stored in either DRAM 112, SRAM 118, or both DRAM 112 and SRAM 118. In some embodiments, when the storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110.

Figure 2:
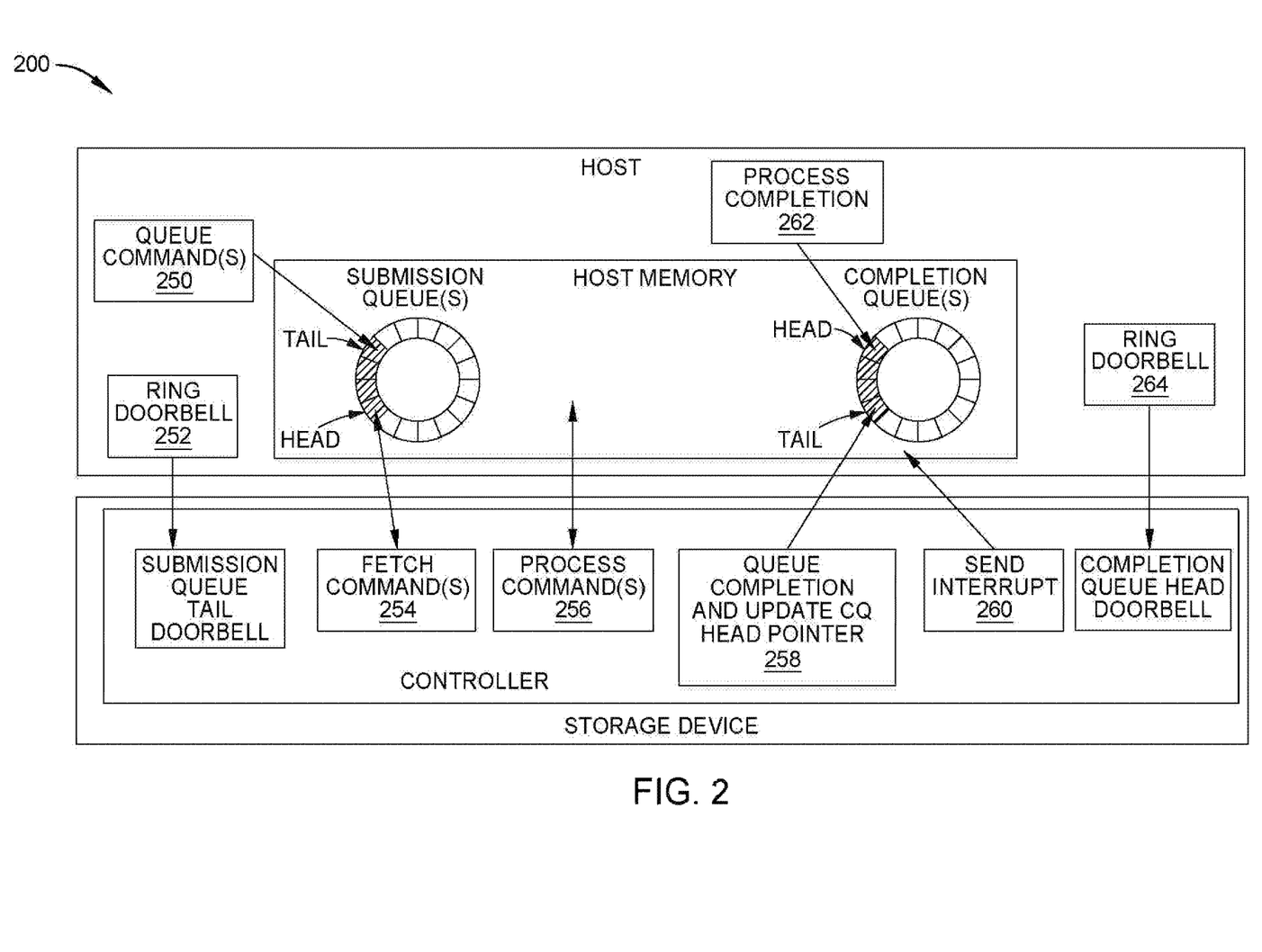
FIG. 2 is a block diagram illustrating a method of operating a storage device to execute a read or write command, according to one embodiment.

FIG. 2 is a block diagram illustrating a method 200 of operating a storage device to execute a read or write command, according to one embodiment. Method 200 may be used with the storage system 100 having a host device 104 and a storage device 106 comprising a controller 108. Method 200 may be used with the device a host device and a storage device comprising a command processor.

Method 200 begins at operation 250, where the host device writes a command into a submission queue as an entry. The host device may write one or more commands into the submission queue at operation 250. The commands may be read commands or write commands. The host device may comprise one or more submission queues. The host device may write one or more commands to the submission queue in any order (i.e., a submission order), regardless of the sequential write order of the one or more commands (i.e., a sequential processing order).

In operation 252, the host device writes one or more updated submission queue tail pointers and rings a doorbell or sends an interrupt signal to notify or signal the storage device of the new command that is ready to be executed. The host may write an updated submission queue tail pointer and send a doorbell or interrupt signal for each of the submission queues if there are more than one submission queues. In operation 254, in response to receiving the doorbell or interrupt signal, a controller of the storage device fetches the command from the one or more submission queue, and the controller receives or DMA reads the command.

In operation 256, the controller processes the command and writes or transfers data associated with the command to the host device memory. The controller may process more than one command at a time. The controller may process one or more commands in the submission order or in the sequential order. Processing a write command may comprise identifying a zone to write the data associated with the command to, writing the data to one or more logical block addresses (LBA) of the zone, and advancing a write pointer of the zone to identify the next available LBA within the zone.

In operation 258, once the command has been fully processed, the controller writes a completion entry corresponding to the executed command to a completion queue of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 262, the host device processes the completion entry. In operation 264, the host device writes an updated CQ head pointer to the storage device and rings the doorbell or sends an interrupt signal to the storage device to release the completion entry.

Figure 3A:
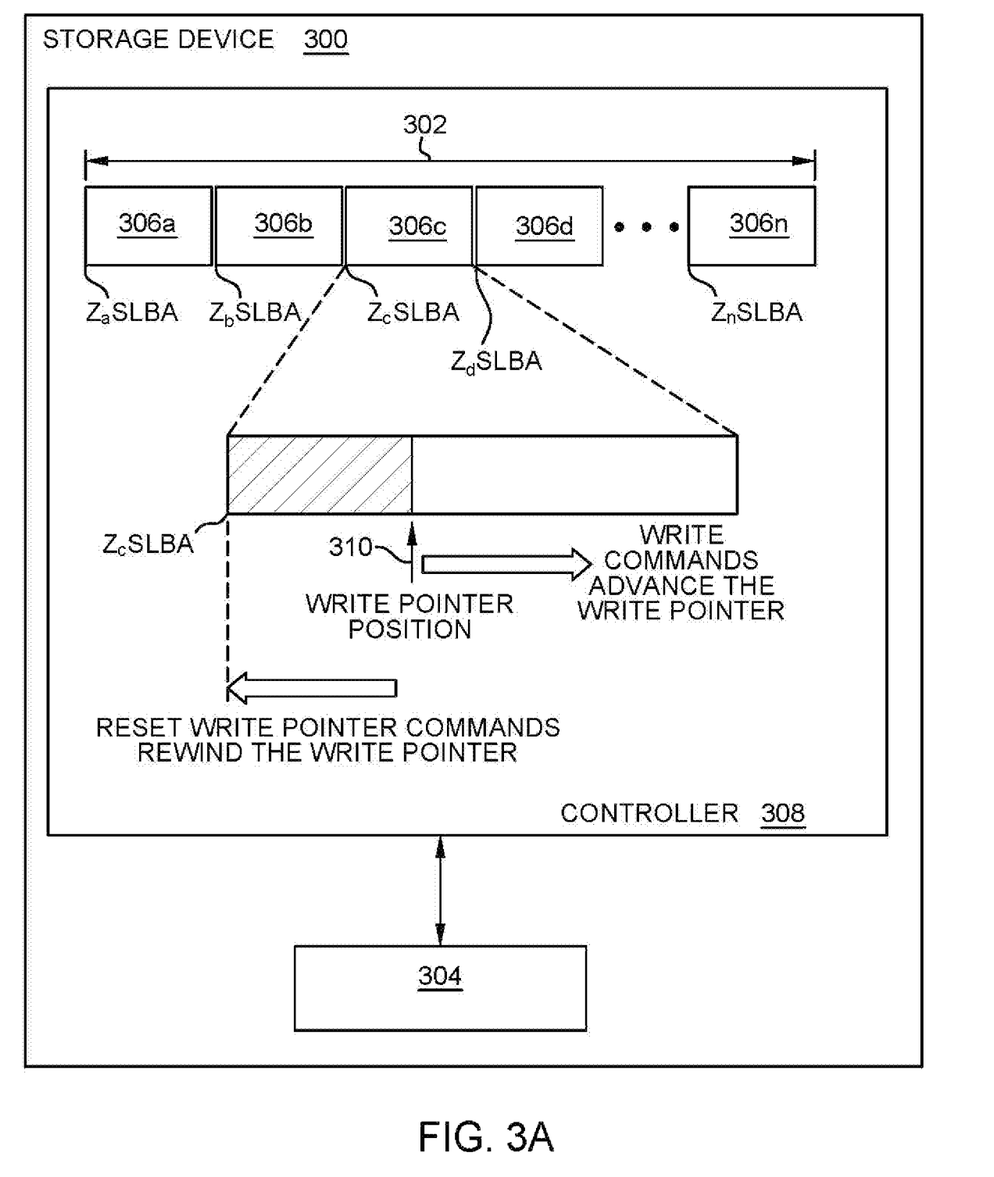
FIG. 3A illustrates a zoned namespaces utilized in a storage device, according to one embodiment.
Figure 3B:
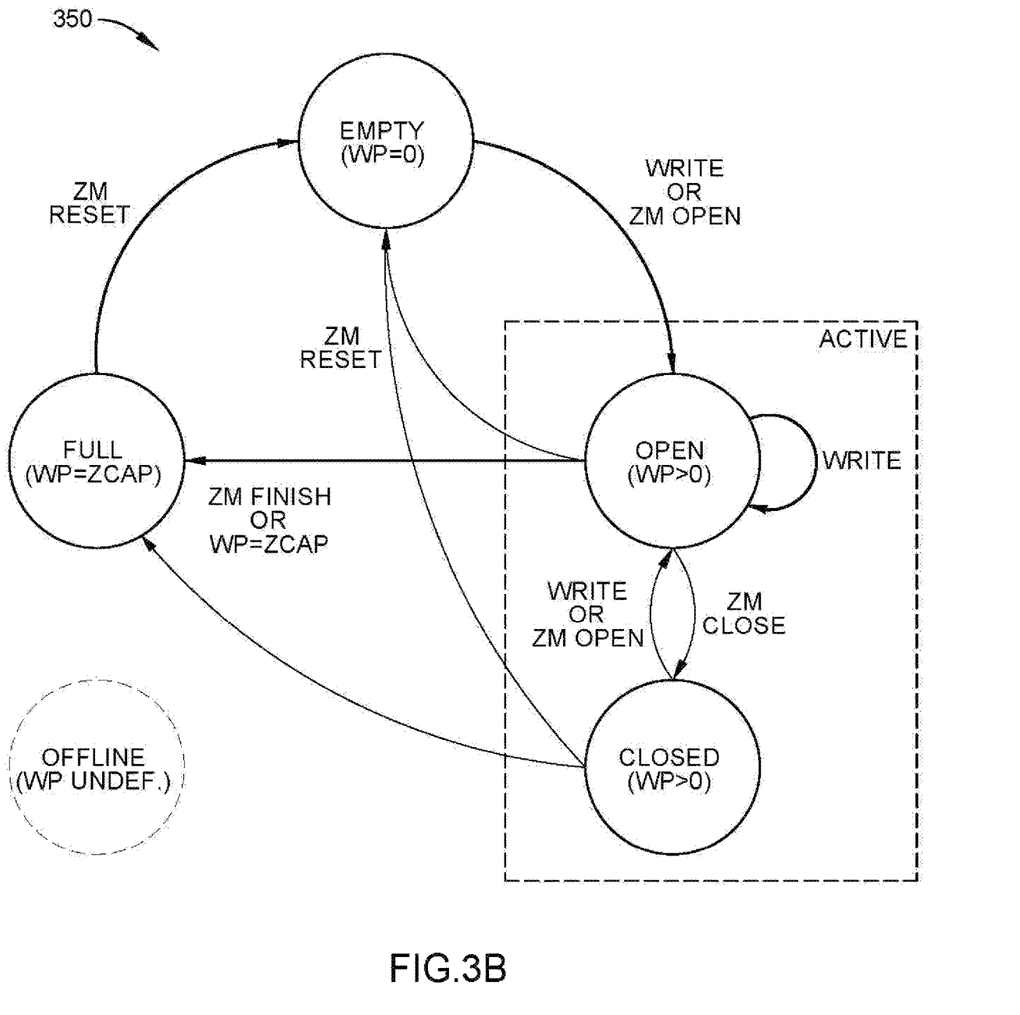
FIG. 3B illustrates a state diagram for the zoned namespaces of the storage device of FIG. 3A, according to one embodiment.

FIG. 3A illustrates a Zoned Namespaces (ZNS) 302 view utilized in a storage device 300, according to one embodiment. The storage device 300 may present the ZNS 302 view to a host device. FIG. 3B illustrates a state diagram 350 for the ZNS 302 of the storage device 300, according to one embodiment. The storage device 300 may be the storage device 106 of the storage system 100 of FIG. 1. The storage device 300 may have one or more ZNS 302, and each ZNS 302 may be different sizes. The storage device 300 may further comprise one or more conventional namespaces in addition to the one or more Zoned Namespaces 302. Moreover, the ZNS 302 may be a zoned block command (ZBC) for SAS and/or a zoned-device ATA command set (ZAC) for SATA. Host side zone activity may be more directly related to media activity in zoned drives due to the relationship of logical to physical activity possible.

In the storage device 300, the ZNS 302 is the quantity of NVM that can be formatted into logical blocks such that the capacity is divided into a plurality of zones 306a-306n (collectively referred to as zones 306). The NVM may be the storage unit or NVM 110 of FIG. 1. Each of the zones 306 comprise a plurality of physical or erase blocks (not shown) of a memory unit or NVM 304, and each of the erase blocks are associated a plurality of logical blocks (not shown). Each of the zones 306 may have a size aligned to the capacity of one or more erase blocks of a NVM or NAND device. When the controller 308 receives a command, such as from a host device (not shown) or the submission queue of a host device, the controller 308 can read data from and write data to the plurality of logical blocks associated with the plurality of erase blocks (EBs) of the ZNS 302. Each of the logical blocks is associated with a unique LBA or sector.

In one embodiment, the NVM 304 is a NAND device. The NAND device comprises one or more dies. Each of the one or more dies comprises one or more planes. Each of the one or more planes comprises one or more erase blocks. Each of the one or more erase blocks comprises one or more wordlines (e.g., 256 wordlines). Each of the one or more wordlines may be addressed in one or more pages. For example, an MLC NAND die may use upper page and lower page to reach the two bits in each cell of the full wordline (e.g., 16 KiB per page). Furthermore, each page can be accessed at a granularity equal to or smaller than the full page. A controller can frequently access NAND in user data granularity LBA sizes of 512 bytes. Thus, as referred to in the below description, NAND locations are equal to a granularity of 512 bytes. As such, an LBA size of 512 bytes and a page size of 16 KiB for two pages of an MLC NAND results in 32 LBAs per wordline. However, the NAND location size is not intended to be limiting, and is merely used as an example.

When data is written to an erase block, one or more logical blocks are correspondingly updated within a zone 306 to track where the data is located within the NVM 304. Data may be written to one zone 306 at a time until a zone 306 is full, or to multiple zones 306 such that multiple zones 306 may be partially full. Similarly, when writing data to a particular zone 306, data may be written to the plurality of erase blocks one block at a time, in sequential order of NAND locations, page-by-page, or wordline-by-wordline, until moving to an adjacent block (i.e., write to a first erase block until the first erase block is full before moving to the second erase block), or to multiple blocks at once, in sequential order of NAND locations, page-by-page, or wordline-by-wordline, to partially fill each block in a parallel fashion (i.e., writing the first NAND location or page of each erase block before writing to the second NAND location or page of each erase block). This sequential programming of every NAND location is a typical non-limiting requirement of many NAND EBs.

When a controller 308 selects the erase blocks that will store the data for each zone, the controller 308 will be able to choose the erase blocks either at the zone open time, or it may choose the erase blocks as it reaches a need to fill the first wordline of that particular erase block. This may be more differentiating when the above described method of filling one erase block completely prior to starting the next erase block is utilized. The controller 308 may use the time difference to select a more optimal erase block in a just-in-time basis. The decision of which erase block is allocated and assigned for each zone and its contiguous LBAs can be occurring for zero or more concurrent zones at all times within the controller 308.

Each of the zones 306 is associated with a zone starting logical block address (ZSLBA) or zone starting sector. The ZSLBA is the first available LBA in the zone 306. For example, the first zone 306a is associated with $Z_a$SLBA, the second zone 306b is associated with $Z_b$SLBA, the third zone 306c is associated with $Z_c$SLBA, the fourth zone 306d is associated with $Z_d$SLBA, and the $n^{th}$ zone 306n (i.e., the last zone) is associated with $Z_n$SLBA. Each zone 306 is identified by its ZSLBA, and is configured to receive sequential writes (i.e., writing data to the NVM 110 in the order the write commands are received).

As data is written to a zone 306, a write pointer 310 is advanced or updated to point to or to indicate the next available block in the zone 306 to write data to in order to track the next write starting point (i.e., the completion point of the prior write equals the starting point of a subsequent write). Thus, the write pointer 310 indicates where the subsequent write to the zone 306 will begin. Subsequent write commands are 'zone append' commands, where the data associated with the subsequent write command appends to the zone 306 at the location the write pointer 310 is indicating as the next starting point. An ordered list of LBAs within the zone 306 may be stored for write ordering. Each zone 306 may have its own write pointer 310. Thus, when a write command is received, a zone is identified by its ZSLBA, and the write pointer 310 determines where the write of the data begins within the identified zone.

FIG. 3B illustrates a state diagram 350 for the ZNS 302 of FIG. 3A. In the state diagram 350, each zone may be in a different state, such as empty, active, full, or offline. When a zone is empty, the zone is free of data (i.e., none of the erase blocks in the zone are currently storing data) and the write pointer is at the ZSLBA (i.e., WP=0). An empty zone switches to an open and active zone once a write is scheduled to the zone or if the zone open command is issued by the host. Zone management (ZM) commands can be used to move a zone between zone open and zone closed states, which are both active states. If a zone is active, the zone comprises open blocks that may be written to, and the host may be provided a description of recommended time in the active state. The controller 308 comprises the ZM. Zone metadata may be stored in the ZM and/or the controller 308.

The term "written to" includes programming user data on 0 or more NAND locations in an erase block and/or partially filled NAND locations in an erase block when user data has not filled all of the available NAND locations. The term "written to" may further include moving a zone to full due to internal drive handling needs (open block data retention concerns because the bits in error accumulate more quickly on open erase blocks), the storage device 300 closing or filling a zone due to resource constraints, like too many open zones to track or discovered defect state, among others, or a host device closing the zone for concerns such as there being no more data to send the drive, computer shutdown, error handling on the host, limited host resources for tracking, among others.

The active zones may be either open or closed. An open zone is an empty or partially full zone that is ready to be written to and has resources currently allocated. The data received from the host device with a write command or zone append command may be programmed to an open erase block that is not currently filled with prior data. A closed zone is an empty or partially full zone that is not currently receiving writes from the host in an ongoing basis. The movement of a zone from an open state to a closed state allows the controller 308 to reallocate resources to other tasks. These tasks may include, but are not limited to, other zones that are open, other conventional non-zone regions, or other controller needs.

In both the open and closed zones, the write pointer is pointing to a place in the zone somewhere between the ZSLBA and the end of the last LBA of the zone (i.e., WP>0). Active zones may switch between the open and closed states per designation by the ZM, or if a write is scheduled to the zone. Additionally, the ZM may reset an active zone to clear or erase the data stored in the zone such that the zone switches back to an empty zone. Once an active zone is full, the zone switches to the full state. A full zone is one that is completely filled with data, and has no more available sectors or LBAs to write data to (i.e., WP=zone capacity (ZCAP)). In a full zone, the write pointer points to the end of the writeable capacity of the zone. Read commands of data stored in full zones may still be executed.

The zones may have any total capacity, such as 256 MiB or 512 MiB. However, a small portion of each zone may be inaccessible to write data to, but may still be read, such as a portion of each zone storing the XOR data and one or more excluded erase blocks. For example, if the total capacity of a zone 306 is 512 MiB, the ZCAP may be 470 MiB, which is the capacity available to write data to, while 42 MiB are unavailable to write data. The writeable capacity (ZCAP) of a zone is equal to or less than the total zone storage capacity. The storage device 300 may determine the ZCAP of each zone upon zone reset. For example, the controller 308 or the ZM may determine the ZCAP of each zone. The storage device 300 may determine the ZCAP of a zone when the zone is reset.

The ZM may reset a full zone, scheduling an erasure of the data stored in the zone such that the zone switches back to an empty zone. When a full zone is reset, the zone may not be immediately cleared of data, though the zone may be marked as an empty zone ready to be written to. However, the reset zone must be erased prior to switching to an open and active zone. A zone may be erased any time between a ZM reset and a ZM open. Upon resetting a zone, the storage device 300 may determine a new ZCAP of the reset zone and update the Writeable ZCAP attribute in the zone metadata. An offline zone is a zone that is unavailable to write data to. An offline zone may be in the full state, the empty state, or in a partially full state without being active.

Since resetting a zone clears or schedules an erasure of all data stored in the zone, the need for garbage collection of individual erase blocks is eliminated, improving the overall garbage collection process of the storage device 300. The storage device 300 may mark one or more erase blocks for erasure. When a new zone is going to be formed and the storage device 300 anticipates a ZM open, the one or more erase blocks marked for erasure may then be erased. The storage device 300 may further decide and create the physical backing of the zone upon erase of the erase blocks. Thus, once the new zone is opened and erase blocks are being selected to form the zone, the erase blocks will have been erased. Moreover, each time a zone is reset, a new order for the LBAs and the write pointer 310 for the zone 306 may be selected, enabling the zone 306 to be tolerant to receive commands out of sequential order. The write pointer 310 may optionally be turned off such that a command may be written to whatever starting LBA is indicated for the command.

Referring back to FIG. 3A, when the host sends a write command to write data to a zone 306, the controller 308 pulls-in the write command and identifies the write command as a write to a newly opened zone 306. The controller 308 selects a set of EBs to store the data associated with the write commands of the newly opened zone 306 to, and the newly opened zone 306 switches to an active zone 306. The write command may be a command to write new data, or a command to move valid data to another zone for garbage collection purposes. The controller 308 is configured to DMA read new commands from a submission queue populated by a host device.

In an empty zone 306 just switched to an active zone 306, the data is assigned to the zone 306 and the associated set of sequential LBAs of the zone 306 starting at the ZSLBA, as the write pointer 310 is indicating the logical block associated with the ZSLBA as the first available logical block. The data may be written to one or more erase blocks or NAND locations that have been allocated for the physical location of the zone 306. After the data associated with the write command has been written to the zone 306, a write pointer 310 is updated to point to the next LBA available for a host write (i.e., the completion point of the first write). The write data from this host write command is programmed sequentially into the next available NAND location in the erase block selected for physical backing of the zone.

For example, the controller 308 may receive a first write command to a third zone 306c, or a first zone append command. The host identifies sequentially which logical block of the zone 306 to write the data associated with the first command to. The data associated with the first command is then written to the first or next available LBA(s) in the third zone 306c as indicated by the write pointer 310, and the write pointer 310 is advanced or updated to point to the next available LBA available for a host write (i.e., WP>0). If the controller 308 receives a second write command to the third zone 306c, or a second zone append command, the data associated with the second write command is written to the next available LBA(s) in the third zone 306c identified by the write pointer 310. Once the data associated with the second command is written to the third zone 306c, the write pointer 310 once again advances or updates to point to the next available LBA available for a host write. Resetting the third zone 306c moves the write pointer 310 back to the $Z_c$SLBA (i.e., WP=0), and the third zone 306c switches to an empty zone.

Figure 4:
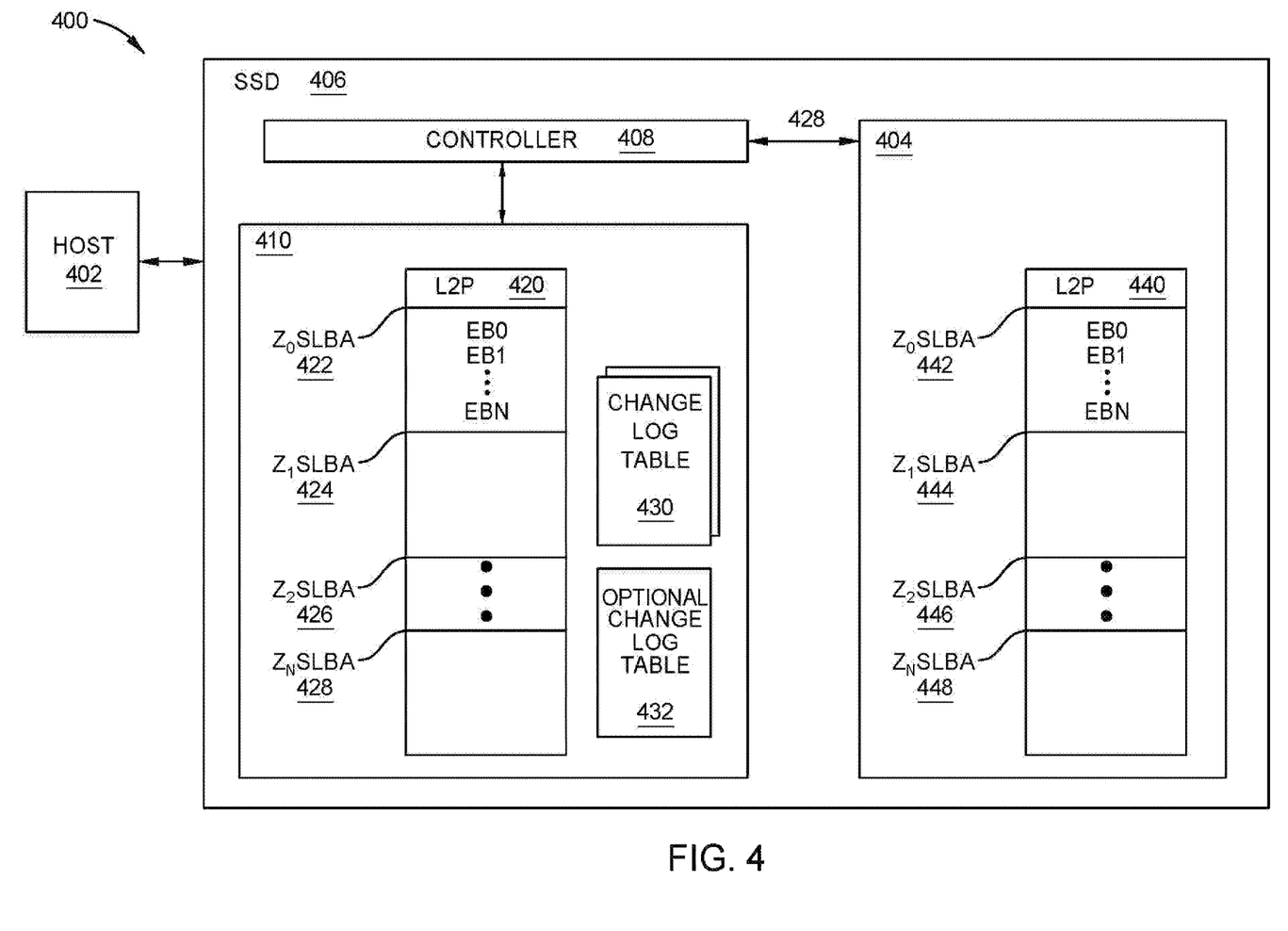
FIG. 4 is a schematic block diagram illustrating a storage system, according to another embodiment.

FIG. 4 is a schematic block diagram illustrating a storage system 400, according to another embodiment. In the following descriptions, the non-volatile storage unit 404 is referred to as a NVM for simplification and exemplary purposes. The system 400 includes a host 402, a storage device 406, and a NVM 404. The host 402 may be the host 104 of FIG. 1. Furthermore, the NVM 404 may be the NVM 110 of FIG. 1 and/or the NVM 310 of FIG. 3A.

The storage device 406 of FIG. 4 is a SSD 406. The SSD 406 may be the storage device 106 or the storage device 300 of FIG. 3A. The SSD 406 is an example of a possible embodiment of a storage device. Other embodiments of a storage device may exist. The SSD 406 comprises a controller 408 and a first volatile memory 410, such as a DRAM, among other components not shown. The controller 408 may be the controller 108 of FIG. 1. The DRAM 410 may be the DRAM 112 of FIG. 1. In the following descriptions, a first volatile memory 410 may be referenced to as DRAM memory for simplification and exemplary purposes.

The DRAM 410 comprises a first logical to physical address (L2P) table 420 and one or more change log tables 430 (referred to as change log table 430). When a command is received by the SSD 406 from the host 402, the command is associated with a logical block address (LBA). The pointer of the LBA of the data associated with the command is then associated with a physical location in the NVM 404 of where the data is being stored. The controller 408 is configured to update the first L2P table 420 to associate the LBAs of data to the physical location of where the corresponding data is stored in the NVM 404 using pointers. The first L2P table 420 is partitioned into one or more sections (e.g., L2P sections), such as $Z_0$SLBA 422, $Z_1$SLBA 424, $Z_2$SLBA 426, and $Z_N$SLBA 428, where N represents a variable value for the last L2P section in the first L2P table 420. Each L2P section 422, 424, 426, 428 comprises one or more LBA pointers pointing from an LBA to the corresponding NAND location or cell (e.g., 4 KiB sized location) in a zone in the NVM 404 where the data associated with the LBA is currently being stored physically.

The first L2P table 420 comprises a plurality of L2P sections. An L2P section may correspond with a zone, which may be the zones 306 in FIG. 3A, within the NVM 404. Since data is written to zones sequentially, each L2P section 422, 424, 426, 428 may comprise a plurality of sequential pointers for each zone. As such, each L2P section 422, 424, 426, 428 begins with a corresponding zone starting logical block address (ZSLBA), such as $Z_c$SLBA of zone 306c of FIG. 3A.

Furthermore, as data is written, erased, or updated to the NVM 404, the changes are reflected in a change log table 430 for the corresponding L2P section 422, 424, 426, 428. The change log table 430 tracks changes to each L2P section 422, 424, 426, 428 in sizes smaller than the L2P section size (i.e., a change log section). The change log table 430 is then copied to the second L2P table 440 in the NVM 404 after certain criteria are met, such as after a predetermined time has passed, the change log table 430 is filled, and/or a power loss event occurs. In one embodiment, if the size of a zone, such as the first zone 306a of FIG. 3A, is 512 MiB, the number of pointers that a L2P section contains is about 131,072 pointers of a 4 B size. Thus, in such an embodiment, each L2P section size is about 512 KiB. Since the change log table 430 tracks only the changes, also referred to herein as "deltas", made to each L2P section, the change log table 430 size is about 1 KiB. The previous values listed are not intended to be limiting, but to provide examples of possible embodiments.

The DRAM 410 includes a secondary or optional change log table 432 to track updates to the change log table 430. The optional change log table 432 may store pointers indicating or pointing to checkpoints of the change log table 430, where the checkpoints signify the start of data that has not been copied to the NVM 404. Additionally, the change log table 430 may comprise checkpoints itself. In one embodiment, the checkpoints may be in deterministic locations such that the checkpoint locations are always known. The checkpoints may be equally spaced throughout the optional change log table 432 and/or the change log table 430 (i.e., the same amount of data is between each checkpoint). In another embodiment, the checkpoint locations may not be equally spaced (i.e., the amount of data between each checkpoint varies). For example, the optional change log table 432 may track the location of the checkpoint locations scattered throughout the change log table 430. The DRAM 410 may have one or more optional change log tables 432.

In another embodiment, the change log table tracking may be implemented with another NVM media or NVM media region. A common example is to attach a NOR chip through a SPI interface to the controller allowing for robust program in place of data without garbage collection at the cost of an extra part on the SSD.

A zone capacity in the NVM 404 may be 256 MiB or 512 MiB minus space lost to storing parity data, controller metadata, or physical capacity lost to grown defective errors. Each zone may comprise a plurality of erase blocks that make up the zone capacity. An erase block is comprised of wordlines. For example, an erase block of a TLC memory may have 256 wordlines, where each wordline has a size of 16 KiB/page, and each wordline consists of three pages. The total size of an erase block of a TLC memory is 256 wordlines*3 pages/wordline*16 KiB/page=12,288 KiB or 12 MiB minus space lost to storing metadata. The values contributing to the erase block size and zone capacity are not intended to be limiting nor restricting, but are used to provide an example of a possible size of the erase block and an example of a possible zone size. The ZCAP referred to in FIG. 3A may be applicable to the zone size of FIG. 4. Furthermore, each zone in the NVM 404 may have the same ZCAP or the same size.

The NVM 404 comprises a plurality of zones (not shown) with a capacity to store user data, parity data, and metadata. The NVM 404 also comprises a second L2P table 440. Because the DRAM 410 is a volatile memory unit, a device power failure will cause the DRAM 410 data to be flushed to the NVM 404, or the data in the DRAM 410 may be lost. If a power failure event occurs, the SSD 406 may have one or more capacitors with adequate amount of power stored to provide the power to the SSD 406 to program the data in the first L2P table 420 of the DRAM 410 to the second L2P table 440 of the NVM 404. Furthermore, the power fail infrastructure may update the second L2P table 440 with the data in the first L2P table 420 about once every 20 seconds or about three times per minute, so that if the capacitors fail, the L2P table 440 may contain the current LBA pointer information, or whenever the change log table 430 is at capacity (i.e., out of dedicated change log space, which may be 1 KiB of space). For example, once the change log table 430 is at capacity, the change log table is copied to the second L2P table 440 in the NVM 404. The update time previously referenced is utilized as an example and is not intended to be limiting nor restricting the time between updates. The second L2P table 440 is updated to reflect the first L2P table 420 periodically. Similar to the first L2P table 420, each L2P section 442, 444, 446, 448 of the second L2P table 440 has a size equal to the corresponding zone.

The SSD 406 receives one or more commands from a host 402, and the one or more commands pass through the controller 408 before being written to the NVM 404. Each of the one or more commands identifies which zone within the NVM 404 the data associated with the write command should be stored. For example, a zone, such as 306a of FIG. 3A, may have multiple wordlines or NAND locations available for data. A write pointer, such as the pointer 310 of FIG. 3A, refers to the first available wordline or NAND location to write data to within the zone. When another write command is received by the host, the pointer moves to the next available wordline or NAND location. Writing data to the NVM 404 occurs sequentially and not randomly. Furthermore, the first zone of the NVM 404 may be filled to capacity prior to filling the second zone of the NVM 404 and the second zone may be filled to capacity prior to filling the third zone of the NVM 404, and so on.

As data is written sequentially, or semi-sequentially if wordline interleaving is occurring (e.g., foggy fine programming), to each erase block, such as EB0 and EB1, or to each wordline, such as WL0 and WL1, of a first zone, such as zone 306a of FIG. 3A, the LBA section pointer updates the first L2P table 420 in the DRAM 410 with the current location of the data associated with each LBA within a zone. The controller 408 may update the second L2P table 440 about once every 20 seconds or about three times per minute with the information in the first L2P table 420. Furthermore, each time an erase block is written to or updated, the LBA pointer associated with the erase block in the first L2P table 420 is updated. For example, if data associated with a first LBA if written to EB0 of a first zone, the pointer associated with EB0 of a first zone in the first L2P table 420 is updated to show that EB0 of a first zone contains data associated with the first LBA. The second L2P table 440 is updated to match the first L2P table 420 after a predetermined amount of time has passed.

Furthermore, in conventional SSDs not utilizing ZNS, when data in an erase block is deallocated (e.g., trimmed, erased, or unmapped), the pointers point to a sentinel value, such as "null", indicating the space where the data previously was is empty. The "null" values may be a type of sentinel value to indicate deallocated data. In the following description, the term "null" values may be used synonymously with sentinel values for exemplary purposes. When data stored in multiple erase blocks are erased, the first L2P table 420 will consist of multiple pointers pointing to "null". The "null" values are difficult to power fail protect due to the hindered ability of the DRAM 410 when copying the "null" values to the second L2P table 440. In order to make the process more efficient, the "null" transfers may be prioritized; however, a bottleneck in the overall transfer speed from the first L2P table 420 to the second L2P table 440 may still exist.

The bottleneck may be in DRAM access bandwidth or increased SSD activities, such as access bandwidth for the programming and data movement of the additional change logs or endurance of the NAND, for example. The bottleneck may occur due to the unaligned "null" LBA pointers in the first L2P table 420 (i.e., the "null" LBA pointers are not sequential in order, but in random order). The unaligned "null" pointers may bottleneck due to the controller 408 having to differentiate between valid LBA pointers and "null" pointers, which may decelerate the transfer process from the first L2P table 420 to the second L2P table 440. The bottleneck may also occur due to multiple L2P sections that are partially filled. The partially filled L2P sections indicate that a greater than the optimal amount of buffers are in current use, decreasing the total available volatile memory to be used to store other data.

By associating the size of the L2P section to the size of a zone, the information stored in the first L2P table 420 can be copied more efficiently to the second L2P table 440, and the power fail infrastructure can be optimized. In SSDs utilizing ZNS, data can only be erased when an entire zone is erased (i.e., data cannot be erased from individual erase blocks alone). Instead of erasing individual erase blocks, data is only erased when the entire zone can be erased. If the entire zone cannot be erased, then a LBA pointer will point to an outdated erase block. Though an LBA pointer will be pointing to an outdated LBA, unaligned "null" pointers will not exist in the first L2P table 420. Rather, when an entire zone is erased, each LBA pointer in an L2P section, such as $Z_0$SLBA 422, in the first L2P table 420 will point to "null". As such, each LBA pointer pointing to "null" will be aligned within a change log. The "null" pointer indicates that the entire erased zone is empty.

By erasing an entire zone instead of erasing individual erase blocks scattered throughout a single zone or a multitude of zones, "null" pointers may no longer be randomly dispersed throughout the first L2P table 420. The entire L2P section will point to "null" because the L2P section data and the corresponding zone data are associated with each other. Since the entire L2P table section is "null", the transfer from the first L2P table 420 to the second L2P table 440 is simplified. The DRAM 410 may no longer have to spend as many resources to differentiate the "null" pointers from the valid LBA pointers when transferring to the second L2P table 440. The second L2P table 440 is updated to match the first L2P table 420, showing the first L2P section is "null" and the second L2P section, such as $Z_1$SLBA 444, has current LBA pointers pointing to a second zone, such as a second zone 306*b* of FIG. 3A.

Figure 5:
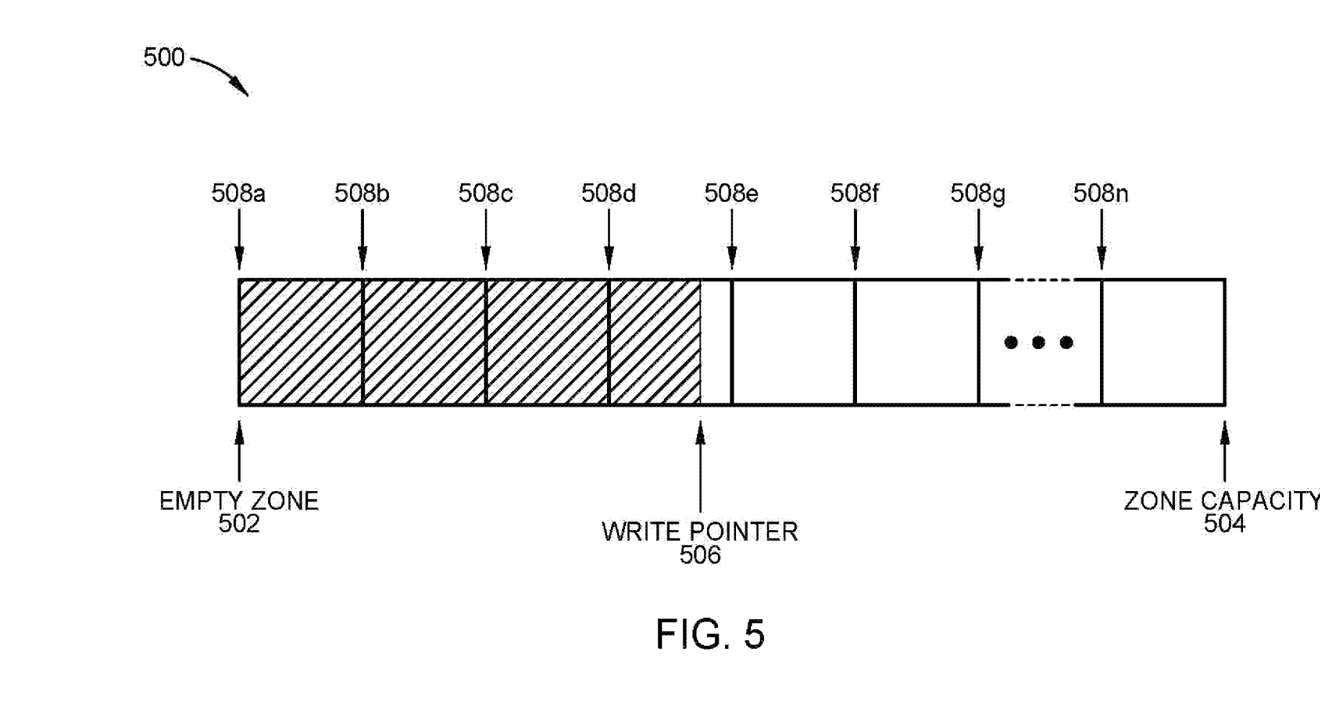
FIG. 5 illustrates a zone of a storage device partitioned into change log sections, according to one embodiment.

FIG. 5 illustrates a zone 500 of a storage device partitioned into change log sections, according to one embodiment. The zone 500 illustrated may represent any zone in the storage device, such as a first zone 306*a* of FIG. 3A. Furthermore, the zone 500 may correspond to a first L2P section, such as a $Z_0$SLBA 422 of FIG. 4. The zone 500 is partitioned into a plurality of sections that align with the change log table (i.e., change log sections 508*a*-508*n*, collectively referred to as change log sections 508), where each change log section 508, records changes to data in the zone corresponding to a first zone section. Each change log section 508 represents the change log table, such as the change log table 430 of FIG. 4. In other words, a change log section 508 represents the amount of changes the change log table can track before being filled to capacity). In one embodiment, the zone section size may be any suitable size to partition the zone equally.

In FIG. 5, an erased or empty zone (e.g., a zone currently storing no data) is indicated by the empty zone marker 502, and a zone at capacity indicated by the zone capacity marker 504. The write pointer 506 indicates the current location of the data written to the zone 500. As data is written to the zone 500, one or more change log sections 508 are filled with the corresponding changes or updates to the location of data within the storage device. As each change log section 508 is filled, the data in the change log table is programmed to the relevant L2P table sections, such as the $Z_0$SLBA 422 and/or $Z_0$SLBA 442. Thus, the data in the change log sections 508 that have been copied to the volatile memory and/or NVM are considered "pristine values", where the controller recognizes that the data in the zone is current. During a power fail event, the controller may be able to prioritize the relevant data or ignore all of the stable change log sections (e.g., "pristine values" or completely filled contiguous regions) such that the current data is retained after the power fail event occurs.

Each time a change log section is filled to capacity, such as change log sections 508*a*, 508*b*, 508*c*, the change log table 430 is copied to the first and/or second L2P tables 420, 440 and then erased or emptied. Since data is written to zones sequentially, only one change log section 508 will be programmed at a time. While a change log section is current tracking changes to the zone, such as the change log section 508*d*, the change log table 430 and/or the changes tracked may be stored in a buffer (not shown) located in the DRAM 410. The buffer has a greater size than the change log table 430. When a change log section, such as change log section 508*c*, is programmed to the relevant L2P table section of the volatile memory and/or the NVM, the volatile memory buffer is released back to the available buffer pool. Since the change log section 508*d* is currently being programmed, a volatile memory buffer is utilized. However, within the zone 500, a minimal total number of buffers are utilized, such as, in this example, one buffer. By having a minimal number of buffers utilized in the volatile memory, more volatile memory space may become available to store other data, such as user data or controller metadata.

The "null" pointers in a logical to physical address (L2P) table point to erased or moved data in a zone of a non-volatile memory. The first L2P table in the DRAM records the location of all data in the NVM by associating a LBA of data to a physical location in the NVM where the data is stored. After a time period has passed, the first L2P table is copied to the second L2P table in the NVM as a power fail protection infrastructure. In order to transfer the data more efficiently, entire L2P sections are associated with the corresponding zones, and the L2P sections are transferred from the first L2P table to the second L2P table. By associating each L2P section with a corresponding zone, the copying of the first L2P table to the second L2P table can be done in a quicker and more efficient manner, especially in power failure events.

Furthermore, since data can only be erased from the NVM in zone sizes, the entire change log section or L2P section associated with that zone points to "null". Instead of having unaligned "null" pointers throughout the first L2P table, all the "null" pointers exist within the same change log section or L2P section and are thus aligned together. The transfer to the second L2P table from the first L2P table is optimized because the device may no longer need to allocate as many resources to differentiating between "null" pointers and valid pointers, which may speed up the process as well as utilize less power. As such, deallocating or unmapping "null" LBA pointers from the L2P tables is performed in a quicker and more efficient process.

In one embodiment, a storage device comprises a non-volatile storage unit. The capacity of the non-volatile storage unit is divided into a plurality of zones. The non-volatile storage unit comprises a plurality of dies and each of the plurality of dies comprises a plurality of erase blocks. The storage device further comprises a volatile memory unit. The volatile memory unit stores a first logical to physical address table. The first logical to physical address table associates logical block addresses of data to a physical address of where the data is stored in the non-volatile storage unit. The storage also comprises a controller coupled to the non-volatile storage unit and the volatile memory unit. The controller is configured to write data to each zone of the plurality of zones sequentially, and partition the first logical to physical address table into sections. Each partitioned section size aligns with a change log table. The controller is further configured to update a second logical to physical address table stored in the non-volatile storage unit. The second logical to physical address table is updated in the partitioned section size.

The volatile memory unit is DRAM memory and the non-volatile storage unit is NAND memory. The second logical to physical address table is updated about every 20 seconds. Each zone is partitioned into an even number of sections. The second logical to physical address table is updated each time a partitioned section is filled to capacity. The storage device comprises one or more capacitors configured to provide power to the controller, wherein the controller is configured to use the power provided by the one or more capacitors to update the second logical to physical address table to match the first logical to physical address table in a power failure event. One partitioned section is written to at a time. Each zone of the plurality of zones is erased in a zone capacity size. The second logical to physical address table is updated each time a zone is erased.

In another embodiment, a storage device comprises a non-volatile storage unit. The capacity of the non-volatile storage unit is divided into a plurality of zones. The non-volatile storage unit comprises a plurality of dies and each of the plurality of dies comprises a plurality of erase blocks. The storage device also comprises a volatile memory unit. The storage device further comprises a controller coupled to the non-volatile storage unit and the volatile memory unit. The controller is configured to write data associated with one or more commands to a first zone of the plurality of zones sequentially, wherein each zone of the plurality of zones is partitioned into a plurality of sections, the partitioned section size aligning with a change log table. The controller is further configured to update a first logical to physical address table stored in the volatile memory unit. The controller is also configured to update the first logical to physical address table associating with the logical block addresses of the data associated with the one or more commands to a physical address of where the data associated with one or more commands is stored in the first zone. The controller is further configured to erase the data associated with one or more commands from the first zone and update the first logical to physical address table to show the first zone is empty. The controller is also configured to update a second logical to physical address table stored in the non-volatile storage unit to match the first logical to physical address table. The second logical physical address table is updated in the partitioned section size.

The volatile memory unit is DRAM memory and each partitioned section begins with a zone starting logical block address. The second logical to physical address table is updated about 3 times per minute. The first zone comprises a plurality of partitioned sections, and wherein one partitioned section is updated each time data is written to the first zone. The second logical to physical address table is updated during a power failure event. Each zone comprises 32 partitioned sections.

In another embodiment, a storage device comprises a non-volatile storage unit. The capacity of the non-volatile storage unit is divided into a plurality of zones. The non-volatile storage unit further comprises a plurality of dies and each of the plurality of dies comprises a plurality of erase blocks. The storage device also comprises a volatile memory unit. The volatile memory unit stores a first logical to physical address table. The first logical to physical address table associates logical block addresses of data to a physical address of where the data is stored in the non-volatile storage unit. Furthermore, the storage device comprises means for partitioning each zone of the plurality of zones into a plurality of sections, wherein each partitioned section of the plurality of sections aligns with a change log table, and means for updating a partitioned section of a zone each time a command to write data to the zone is received. The storage device further comprises means for updating the first logical to physical address table each time is erased from the non-volatile storage unit. The data erased from the non-volatile storage unit is in a zone capacity size. The storage device comprises means for updated a second logical to physical address table stored in the non-volatile storage unit to match the first logical to physical address table. The second logical to physical address table is updated in the partitioned section size.

The storage device further comprises means for updating the second logical to physical address table to match the first logical to physical address table in a power failure event. The data is erased from the non-volatile storage unit in the size of a zone. Each zone of the plurality of zones has the same size, and each zone is partitioned into an even number of sections. The storage device comprises means for writing data associated with each command sequentially to each of the plurality of zones.

While the foregoing is directed to embodiments of the present disclosure, other and further embodiments of the disclosure may be devised without departing from the basic scope thereof, and the scope thereof is determined by the claims that follow.

What is claimed is:

1. A storage device, comprising:
   a non-volatile storage unit, wherein a capacity of the non-volatile storage unit is divided into a plurality of zones, and wherein the non-volatile storage unit comprises a plurality of dies, each of the plurality of dies comprising a plurality of erase blocks;
   a volatile memory unit, wherein the volatile memory unit stores a first logical to physical address table and a change log table, the first logical to physical address table associating logical block addresses of data to a physical address of where the data is stored in the non-volatile storage unit, wherein the change log table tracks changes made to the first logical to physical address table, the change log table having a smaller capacity than the first logical to physical address table; and
   a controller coupled to the non-volatile storage unit and the volatile memory unit, wherein the controller is configured to:
   write data to each zone of the plurality of zones sequentially;
   partition the first logical to physical address table into sections, wherein each partitioned section aligns with the capacity of the change log table;
   update a second logical to physical address table stored in the non-volatile storage unit, wherein the second logical to physical address table is updated in a partitioned section size of the first logical to physical address table; and
   copy the change log table to the second logical to physical address table upon one or more of a predetermined amount of time expiring, the capacity of the change log table being filled, or a power loss event occurring.

2. The storage device of claim 1, wherein the volatile memory unit is DRAM memory, and wherein the non-volatile storage unit is NAND memory.

3. The storage device of claim 1, wherein the second logical to physical address table is updated every 20 seconds.

4. The storage device of claim 1, wherein each zone is partitioned into an even number of sections.

5. The storage device of claim 1, wherein the second logical to physical address table is updated each time a partitioned section of the second logical to physical address table is filled to capacity.

6. The storage device of claim 1, further comprising one or more capacitors configured to provide power to the controller, wherein the controller is configured to use the power provided by the one or more capacitors to update the second logical to physical address table to match the first logical to physical address table in a power failure event.

7. The storage device of claim 1, wherein one partitioned section of the second logical to physical address table is written to at a time.

8. The storage device of claim 1, wherein each zone of the plurality of zones is erased in a zone capacity size.

9. The storage device of claim 8, wherein the second logical to physical address table is updated each time a zone is erased.

10. A storage device, comprising:
- a non-volatile storage unit, wherein a capacity of the non-volatile storage unit is divided into a plurality of zones, and wherein the non-volatile storage unit comprises a plurality of dies, each of the plurality of dies comprising a plurality of erase blocks;
- a volatile memory unit configured to store a change log table and a first logical to physical address table, the change log table tracking changes made to the first logical to physical address table; and
- a controller coupled to the non-volatile storage unit and the volatile memory unit, wherein the controller is configured to:
  - write data associated with one or more commands to a first zone of the plurality of zones sequentially, wherein each zone of the plurality of zones is partitioned into a plurality of sections, a partitioned section size aligning with a capacity of the change log table;
  - update the first logical to physical address table, the first logical to physical address table associating logical block addresses of the data associated with the one or more commands to a physical address of where the data associated with the one or more commands is stored in the first zone;
  - erase the data associated with the one or more commands from the first zone;
  - update the first logical to physical address table to show the first zone is empty;
  - update a second logical to physical address table stored in the non-volatile storage unit to match the first logical to physical address table, wherein the second logical to physical address table is updated in the partitioned section size of each zone; and
  - copy the change log table to the second logical to physical address table upon one or more of a predetermined amount of time expiring, the capacity of the change log table being filled, or a power loss event occurring.

11. The storage device of claim 10, wherein the volatile memory unit is DRAM memory, and wherein each partitioned section of each zone begins with a zone starting logical block address.

12. The storage device of claim 10, wherein the second logical to physical address table is updated 3 times per minute.

13. The storage device of claim 10, wherein the first zone comprises a plurality of partitioned sections, and wherein one partitioned section of the first zone is updated each time data is written to the first zone.

14. The storage device of claim 10, wherein the second logical to physical address table is updated during a power failure event.

15. The storage device of claim 10, wherein each zone comprises 32 partitioned sections.

16. A storage device, comprising:
- a non-volatile storage unit, wherein a capacity of the non-volatile storage unit is divided into a plurality of zones, and wherein the non-volatile storage unit comprises a plurality of dies, each of the plurality of dies comprising a plurality of erase blocks;
- a volatile memory unit, the volatile memory unit storing a first logical to physical address table and a change log table, the first logical to physical address table associating logical block addresses of data to a physical address of where the data is stored in the non-volatile storage unit, wherein the change log table tracks changes made to the first logical to physical address table;
- means for partitioning each zone of the plurality of zones into a plurality of sections, wherein each partitioned section of the plurality of sections aligns with a capacity of the change log table;
- means for updating a partitioned section of a zone each time a command to write data to the zone is received;
- means for updating the first logical to physical address table each time data is erased from the non-volatile storage unit, wherein the data is erased from the non-volatile storage unit in a zone capacity size;
- means for updating a second logical to physical address table stored in the non-volatile storage unit to match the first logical to physical address table, wherein the second logical to physical address table is updated in a partitioned section size of each zone; and
- means for copying the change log table to the second logical to physical address table upon one or more of a predetermined amount of time expiring, the capacity of the change log table being filled, or a power loss event occurring.

17. The storage device of claim 16, further comprising means for updating the second logical to physical address table to match the first logical to physical address table in a power failure event.

18. The storage device of claim 16, wherein the data is erased from the non-volatile storage unit in the size of a zone.

19. The storage device of claim 16, wherein each zone of the plurality of zones has the same size, and wherein each zone is partitioned into an even number of sections.

20. The storage device of claim 19, further comprising means for writing the data associated with each command sequentially to each of the plurality of zones.

* * * * *